(12) United States Patent
Kyrtsos

(10) Patent No.: US 6,632,252 B1
(45) Date of Patent: Oct. 14, 2003

(54) THERMALLY ACTIVATED POWER SUPPLY FOR SENSOR SYSTEM

(75) Inventor: Christos T. Kyrtsos, Southfield, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 441 days.

(21) Appl. No.: 09/602,795

(22) Filed: Jun. 23, 2000

(51) Int. Cl.⁷ .............................................. G08C 19/12
(52) U.S. Cl. ..................... 3440/870.17; 340/870.16; 340/449; 464/23; 374/100; 374/141; 374/153; 310/68 C
(58) Field of Search ................. 340/870.17, 870.16, 340/447, 449; 464/23, 31; 374/45, 57, 100, 141, 153; 180/14.4, 297; 310/68 C

(56) References Cited

U.S. PATENT DOCUMENTS

| | | | | |
|---|---|---|---|---|
| 4,812,826 A | * | 3/1989 | Kaufman et al. | 246/169 A |
| 4,882,564 A | * | 11/1989 | Monroe et al. | 340/449 |
| 5,106,202 A | * | 4/1992 | Anderson et al. | 250/231.1 |
| 5,107,247 A | * | 4/1992 | Malaca | 340/439 |
| 5,140,302 A | * | 8/1992 | Hara et al. | 327/512 |
| 5,203,278 A | * | 4/1993 | Kinney | 116/218 |
| 5,438,322 A | * | 8/1995 | Martin et al. | 246/169 A |
| 5,463,233 A | * | 10/1995 | Norling | 257/254 |
| 6,278,379 B1 | * | 8/2001 | Allen et al. | 324/655 |
| 6,286,992 B1 | * | 9/2001 | Kyrtsos | 374/104 |

FOREIGN PATENT DOCUMENTS

JP 08057507a * 3/1996

* cited by examiner

Primary Examiner—Michael Horabik
Assistant Examiner—Albert K. Wong
(74) Attorney, Agent, or Firm—Carlson, Gaskey & Olds

(57) ABSTRACT

A sensor system includes a housing that houses a thermally sensitive sensor, a transmitter portion and a power source. Preferably, the sensor device is encapsulated to protect the components from the environment. The transmitter generates a signal in response to the sensor detecting a temperature in a vehicle component that exceeds a predetermined temperature. A receiver is located remotely from the transmitter to receive the signal. The power supply generates electricity when the temperature of the vehicle component achieves an initial threshold temperature that is less than the predetermined temperature.

34 Claims, 2 Drawing Sheets

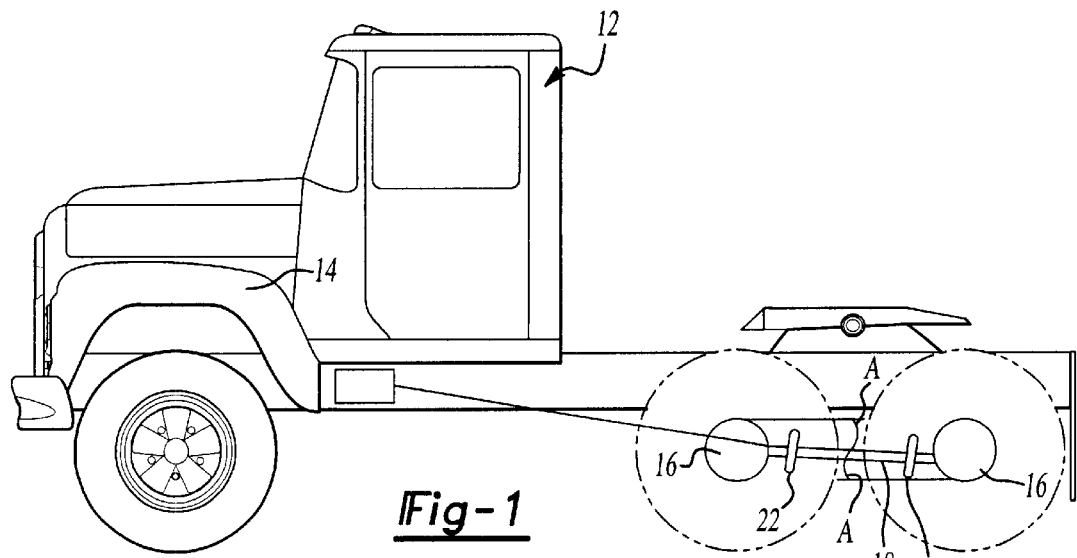
*Fig-1*
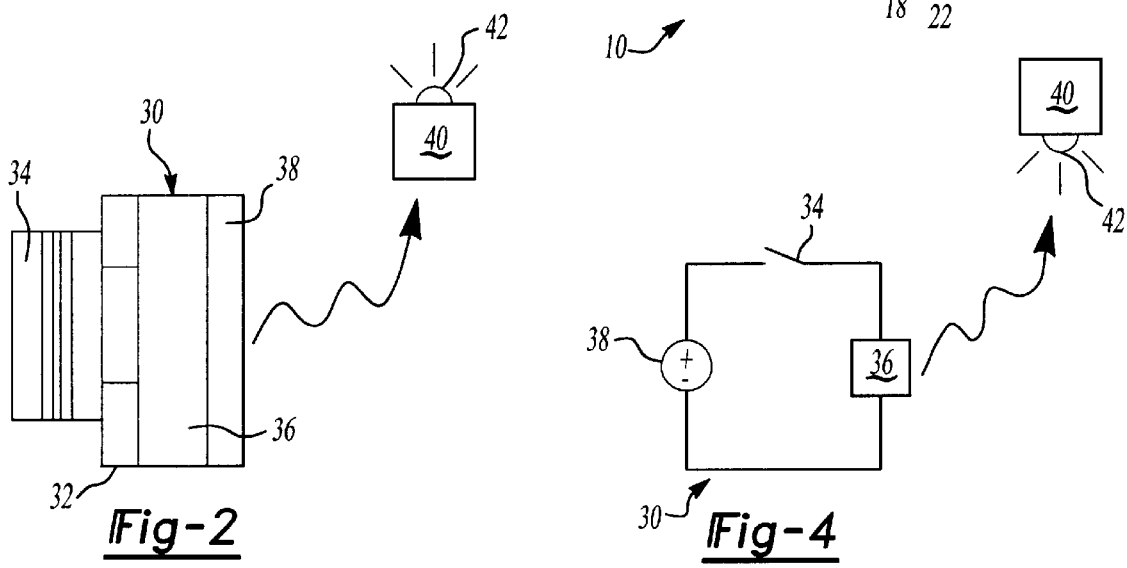
*Fig-2*
*Fig-4*
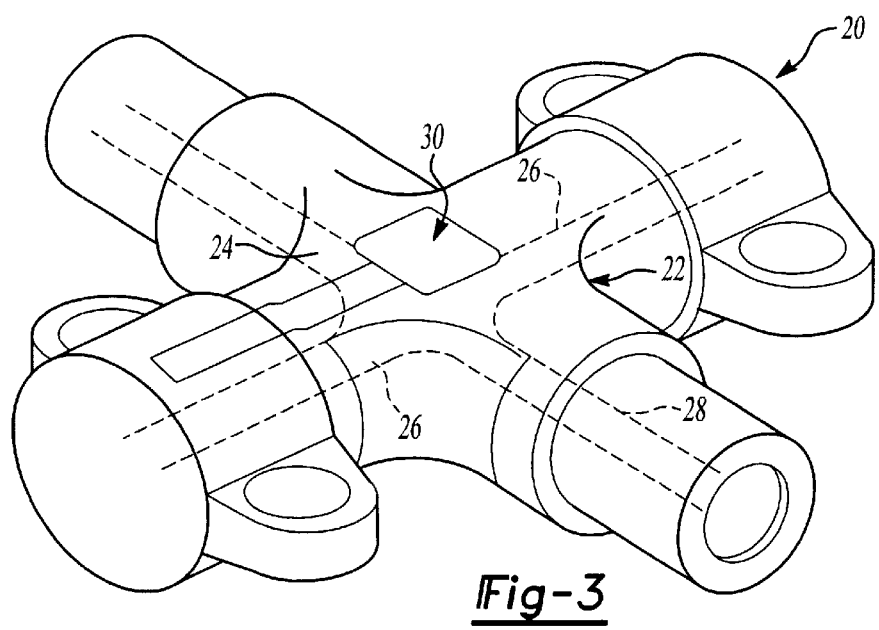
*Fig-3*

THERMALLY ACTIVATED POWER SUPPLY FOR SENSOR SYSTEM

BACKGROUND OF THE INVENTION

This invention generally relates to a temperature-based sensor for detecting undesirable vibrations or temperatures in a vehicle component.

Due to driving conditions and vehicle operation, many of the components undergo vibrations, which cause the components to deviate from the desired direction of movement. Further, many vehicle components must be maintained within particular temperature ranges to assure proper performance. It is therefore necessary to monitor the vehicle components to assure that they are operating in the proper temperature and vibration ranges to prevent undesirably worn or damaged components.

In order to monitor the temperature and vibration characteristics of the vehicle components, a power source is needed. This power supply must be available at all times during the operational life of the vehicle. This operational time period could be greater than ten (10) years. To provide a ready power source for this length of time is very expensive.

Thus, it is desirable to have a temperature and vibration sensing system that can be powered efficiently and economically throughout the operational life of the vehicle. The system should also be easy to install and maintain.

SUMMARY OF THE INVENTION

In a disclosed embodiment of this invention, a sensor system is used to determine the temperature of a vehicle component. The system includes a housing and a thermally sensitive sensor assembly for generating a signal responsive to the sensor detecting a temperature in the vehicle component that exceeds a predetermined temperature. A power supply is supported by the housing and is used to generate electricity to power the sensor assembly. The power supply is inactive until a predetermined condition is achieved. Preferably, the power supply becomes operational when the temperature of the vehicle component achieves an initial threshold temperature that is less than the predetermined temperature.

In one disclosed embodiment, the power supply is fixed to the housing during operational temperatures that are less than the initial threshold temperature so that there is no relative motion between the power supply and the housing. The power supply is moveable relative to the housing once operational temperatures exceed the initial threshold temperature. Preferably, the power supply is attached to the housing by a material having a melting temperature that is approximately equal to the initial threshold temperature. When the subject vehicle component reaches the initial threshold temperature, the material melts away allowing a portion of the power supply to move relative to the housing.

In one preferred embodiment, the power supply includes a rotating component and a stationary component that is fixed for movement with the housing. When the material melts, the rotating component is allowed to rotate with respect to the stationary component. Preferably, the rotating component is a magnet and the stationary component is a coil assembly such that as the magnet rotates with respect to the coil, electricity is generated to supply power to the sensor system.

The preferred method, for determining temperature of a vehicle component includes the following steps. A sensor assembly is mounted to a vehicle component. A power supply is activated to power the sensor assembly when the component operating temperature exceeds an initial threshold temperature. A signal is generated in response to the sensor assembly detecting a temperature in the vehicle component that exceeds a predetermined temperature that is greater than the initial threshold temperature.

These and other features of the present invention can be best understood from the following specification and drawings, the following of which is a brief description.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 1 diagrammatically illustrates a vehicle including a sensor arrangement designed according to this invention;

FIG. 2 diagrammatically illustrates a sensor designed according to this invention;

FIG. 3 is a perspective view of a universal joint including a sensor arrangement designed according to this invention;

FIG. 4 schematically illustrates the sensor embodiment of FIGS. 1 and 2; and

DETAILED DESCRIPTION OF THE PREFERRED EMBODIMENT

Figure 5:
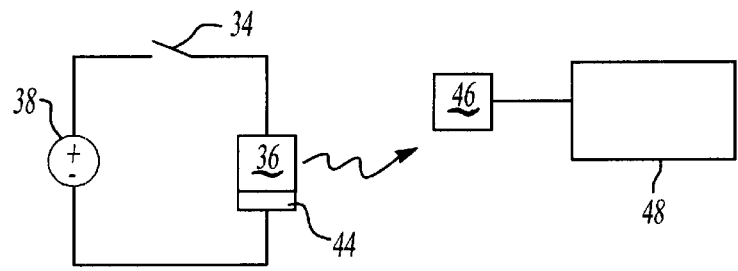
FIG. 5 illustrates another example sensor arrangement designed according to this invention.

FIG. 1 illustrates a driveline system 10 for a vehicle 12. Drivelines include a series of components that move responsive to a motive force provided by an engine 14. The drive line system 10 in the disclosed embodiment includes a pair of differentials 16 connected by a driveshaft 18a. The pair of differentials 16 are typically part of a tandem axle set that is connected to the engine 14 by an extended driveshaft. Connectors 20 such as universal joints (u-joints) 22 link the driveshaft 18b to each differential 16 to provide torque transfer while allowing movement along two axes. The operation of u-joints 22 is well known in the art and will not be discussed in detail.

In some vehicles, the one of the differentials 16 is mounted at a higher vertical position with respect to the ground than the other differential 16. This causes the driveshaft 18a to be mounted at an angle defined as an angle "A". Ideally the angle A would be very small to reduce stresses on the u-joints 22. The greater the angle A, the greater the stresses and/or vibrations can be on the u-joints 22. Sometimes the angle A for the u-joint 22 at the forward differential 16 is different than the angle A for the u-joint 22 at the rearward differential 16. This difference in angles can result in even more increased stresses and vibrations at the u-joint. As stresses and vibrations increase, temperatures rise in the u-joint 22, which can cause increased wear and component damage. Thus, it is important to know the temperature of each u-joint 22 along the driveline 10 to detect when temperatures are rising beyond acceptable levels.

Referring to FIG. 2, a sensor assembly 30 includes a housing 32 that houses a thermally sensitive sensor 34, a transmitter portion 36 and a power source 38. Preferably, the sensor assembly 30 is encapsulated by the housing 32 to protect the components from the environment. Example temperature sensors include thermistors, RTD's, or thermocouples. Example transmitters 36 include infrared, microwave or radio frequency signals to provide communication between the transmitter 36 and a receiver 40 located remotely from the transmitter 36.

A particularly advantageous feature of this invention is that the communication between the transmitter 36 and the receiver 40 is wireless. When the receiver 40 receives a signal from the transmitter 36, it provides an output to a driver of the vehicle that the universal joint 22 has reached a critical temperature. The output can be a visible or audible signal for the driver such as schematically illustrated at 42.

FIG. 3 illustrates a connector 20 having a u-joint 22 designed according to this invention. The universal joint 22 includes a central portion 24 and a plurality of trunnions 26. The u-joint 22 includes lubrication channels 28 that allow lubricants to flow through the body of the u-joint 22. The sensor assembly 30 is positioned in the central portion 24 of the u-joint 22. Preferably, the thermally sensitive sensor 34 has a threaded body that is received in a corresponding threaded aperture on the central portion 24 of the u-joint 22 for easy mounting. This places the sensor 34 inside the u-joint 22 where temperatures can be easily monitored while still providing a sealed environment.

In a universal joint 22, the trunnions 26 typically heat up during undesirable vibrations of the drive line components. This invention recognizes that individual trunnions 26 may reach a critical temperature before the central portion 24 reaches the same temperature because of the heat transfer properties of the universal joint structure. Therefore, the thermally sensitive sensor 34 is preferably configured to cause the transmitter 36 to provide a signal before any one of the trunnions 26 reach the critical temperature.

In one example, a critical temperature is over 190° F. The temperature sensor 34 preferably responds to a temperature that is less than the critical temperature recognizing that a lower temperature across the central portion of the u-joint 22 is sufficiently high when at least one trunnion 26 is reaching the critical temperature. In one example, a temperature of approximately 150° F. at the central portion 24 is considered high enough to indicate a critical temperature at a trunnion 26. When the temperature in the central portion of 24 of the u-joint 22 exceeds a predetermined temperature, the thermostat sensor 34 closes and the transmitter portion 36 is energized by the power source 38 to transmit a signal to a receiver unit 40. It should be understood that temperatures other than 150° F. can be used as the predetermined temperature, but preferably the predetermined temperature should be somewhere in the range of 120° F. to 160° F.

Referring to FIG. 4, one disclosed embodiment of the sensor assembly 30 provides the thermally sensitive sensor 34 as a thermostat that functions much like a normally open switch. When the temperature in the central portion of 24 of the universal joint 22 exceeds a predetermined temperature, the thermostat sensor 34 closes and the transmitter portion 36 is energized by the power source 38 to transmit a signal to a receiver unit 40.

Referring to FIG. 5, another disclosed embodiment sensor device 30' includes a measurement-taking sensor portion 44. When the temperature exceeds a predetermined value, the thermostat sensor 34 closes and the transmitter portion 36 and measurement taking sensor portion 44 are energized by the power source 38. The measurement-taking sensor portion 44 preferably takes a measurement and transmits that measurement as a signal to a receiver unit 46. The measurement-taking sensor 44 can provide a one-time measurement or continuous measurement until the power source is depleted. In this embodiment the signal is transmitted to the receiver unit 46 which is linked to an output 48.

The subject sensing system could also be used in non-driveline vehicle applications. For example, the sensor device 30' can be located within a vehicle tire. When the temperature exceeds a predetermined temperature, such as when the tire pressure is low and additional friction is generated, the thermostat sensor 34 closes and the transmitter portion 36 and measurement taking sensor portion 44 is energized by the power source 38. The measurement taking sensor portion 44 will then measure the pressure in the tire and transmit the pressure via the receiver unit 46. The pressure is then displayed by the output 48 to alert an operator.

Of course, many other measurement-taking sensors are incorporated within the teachings of the present invention.

To maintain the sensor 30 in an operable state for long periods of inactivity, the transmitter 36 is preferably maintained in a dormant state until "awakened" by the thermostat sensor 34. Further, maintaining this dormant state allows the sensor 30 to be hermetically sealed as a single unit. This eliminates the necessity of an external power connection to thereby allow the sensor 30 to be readily located in many small inaccessible locations such as drive line, axle, radiator, tire, and other vehicle components.

The power supply or source 38 is preferably inactive until a predetermined condition has occurred. This allows the power supply 38 to be readily available for long periods of time without having to supply power unnecessarily. Preferably, the power supply 38 becomes operational when the temperature of the vehicle component achieves an initial threshold temperature that is less than the predetermined temperature. For example, if the predetermined temperature for indicating overheating in a u-joint 22 is 150° F. then the initial threshold temperature would be something less than 150° F. This would allow the power supply 38 to be activated to generate electricity for the sensor and transmitter 36. The transmitter 36 would then be ready to transmit signals once an undesirable temperature is reached.

Figure 6:
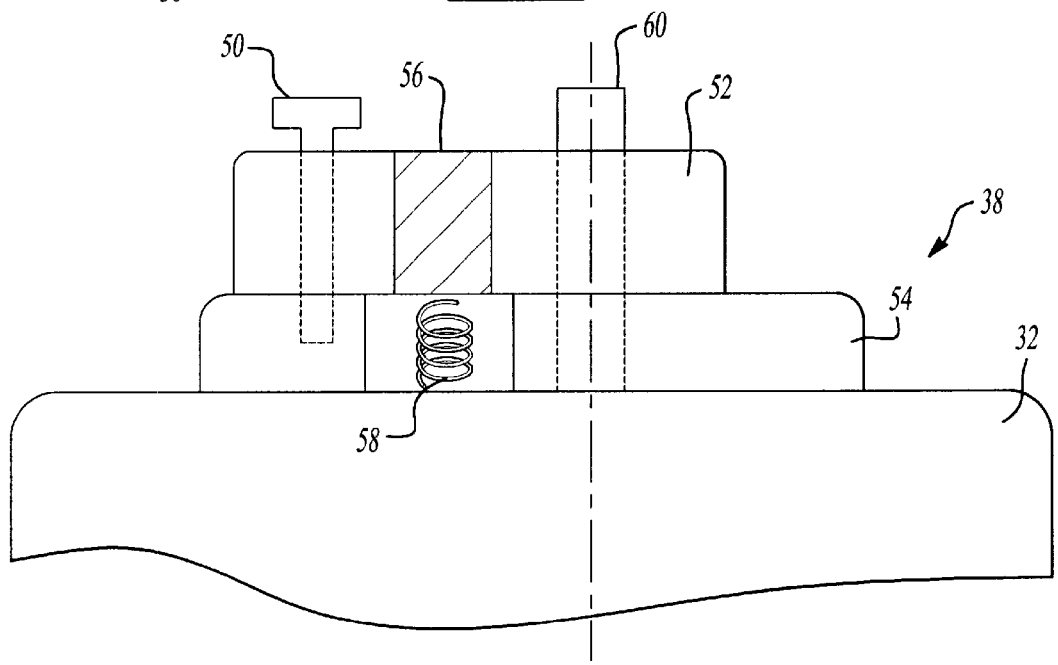
FIG. 6 is a schematic view of one embodiment of a power supply.

Referring to FIG. 6, a first embodiment of a power supply 38 is shown. The power supply 38 is securely attached to the housing 32 during operational temperatures that are less than the initial threshold temperature and is moveable relative to the housing once operational temperatures exceed the initial threshold temperature. In this embodiment, the power supply is attached to the housing 32 with at least one fastener 50 made from a material that has a melting temperature that is approximately equal to the initial threshold temperature. Once the fastener 50 has melted away, a first portion of the power supply 38 is caused to move relative to a second portion of the power supply 38, which generates electricity.

Figure 7:
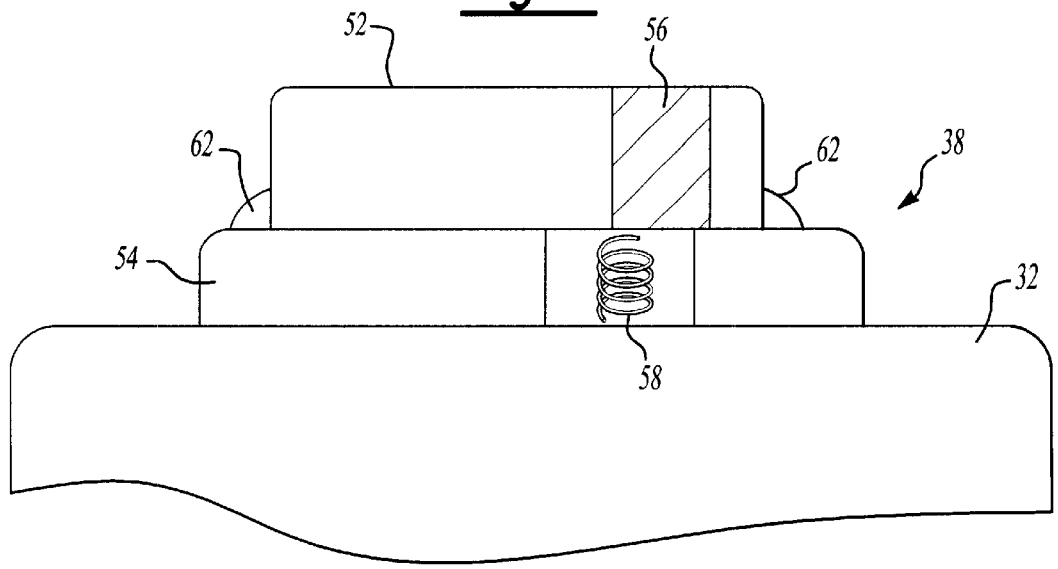
FIG. 7 is a schematic view of an alternate embodiment of a power supply.

In an alternate embodiment, shown in FIG. 7, the power supply 38 is attached to the housing 32 by an epoxy material 62 having a melting temperature that is approximately equal to the initial threshold temperature. Once the epoxy has melted away, a first portion of the power supply 38 is caused to move relative to a second portion of the power supply 38, which generates electricity.

In either embodiment, the power supply 38 includes a movable component 52 and a stationary component 54. Preferably, the moveable component 52 is a magnet 56 and the stationary component 54 is a coil assembly 58. In one embodiment, the magnet 56 and coil 58 are mounted on a common shaft 60 within the housing 32. The coil 58 is fixed on the shaft for movement with the housing 32. The magnet 56 is mounted to the housing 32 by the material that has a melting temperature that is approximately equal to the initial threshold temperature. When the material melts away, the magnet 56 starts to rotate on the shaft 60 with respect to the coil 58. This generates electricity for powering the sensor assembly 30. It should be understood that the reverse orientation could also be used where the coil 58 moves relative to the magnet 56 to generate electricity. Also, alternatively the magnet 56 and coil 58 could be mounted within the housing 32 without a shaft. The coil 58 could be permanently fixed to the housing 32 with the magnet 56 being mounted within the housing 32 with the material having the melting temperature that is approximately equal to the initial threshold temperature. With both components 56, 58 enclosed within the housing 32, once the material melts away, the magnet 56 would move within the housing 32 relative to the coil 58 to generate electricity.

If the housing 32 is mounted to a u-joint 22, then the u-joint 22 will be rotating at high speeds during normal vehicle operation. In order for the magnet 56 to move relative to the housing 32, the magnet 26 must be eccentrically mounted on the shaft 60. In other words, the magnet must be mounted off-center within the housing 32 to allow relative motion between the magnet 56 and housing 32.

Preferably, the magnet 56 should be mounted at the furthest position away from the u-joint 22 to minimize temperature affects on the magnet. Preferably, a rare earth magnet is used for its flux generation characteristics, however, other magnets could also be used. Alternatively, piezo components could be used.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A sensor system for determining the temperature of a vehicle component, comprising:
   a housing;
   a sensor assembly supported by said housing for generating a signal responsive to said sensor assembly detecting a temperature in the vehicle component that exceeds a predetermined temperature; and
   a power supply supported by said housing for providing power to said sensor assembly wherein said power supply becomes operational when the temperature of the vehicle component achieves an initial threshold temperature that is less than said predetermined temperature.

2. The system as set forth in claim 1 wherein said power supply is securely attached to said housing during operational temperatures that are less than said initial threshold temperature and includes a portion that is moveable relative to said housing once operational temperatures exceed said initial threshold temperature.

3. The system as set forth in claim 2 wherein said power supply is attached to said housing with at least one fastener made from a material that has a melting temperature that is approximately equal to said initial threshold temperature.

4. The system as set forth in claim 2 wherein said power supply is attached to said housing by an epoxy material having a melting temperature that is approximately equal to said initial threshold temperature.

5. The system as set forth in claim 2 wherein said power supply includes a magnet and a coil supported on a common shaft with one of said magnet or said coil being fixed to said shaft and the other of said magnet or coil rotating with respect to said shaft when said initial threshold temperature is exceeded to generate electricity for powering said sensor assembly.

6. The system as set forth in claim 5 wherein said shaft is supported by said housing, said coil is fixed to said shaft, and said magnet rotates with respect to said shaft when said initial threshold temperature is exceeded.

7. The system as set forth in claim 5 wherein said magnet is eccentrically mounted on said shaft to rotate in relative motion to said housing.

8. The system as set forth in claim 2 wherein said sensor assembly includes a temperature sensor, a transmitter supported by said housing for generating said signal responsive to said temperature sensor detecting a temperature in the vehicle component that exceeds said predetermined temperature, and a receiver located remotely from said transmitter to receive said signal wherein electricity to power said transmitter is generated by said power supply.

9. The system as set forth in claim 1 wherein the vehicle component has a predetermined critical temperature limit at which component failure begins and wherein said predetermined temperature is set at a value that is less than said critical failure temperature limit.

10. The system as set forth in claim 1 wherein said power supply only generates power when the temperature of the vehicle component achieves an initial threshold temperature that is less than said predetermined temperature.

11. The system as set forth in claim 10 wherein said power supply includes at least a first component and a second component mounted within said housing, said first and second components being held fixed relative to each other at temperatures below said initial threshold temperature and said first component being moveable relative to said second component once said initial threshold temperature is exceeded.

12. The system as set forth in claim 11 including a joining member comprised of a material having a melting temperature approximately equal to said initial threshold temperature wherein said joining member is used to securely attach said first component to said second component.

13. The system as set forth in claim 12 wherein said joining member comprises and adhesive and said material is comprised of an epoxy.

14. The system as set forth in claim 12 wherein said joining member comprises at least one fastener.

15. A sensor system for determining the temperature of a u-joint assembly in a vehicle driveline, comprising:
   a housing mounted to a u-joint;
   a temperature sensor supported by said housing;
   a transmitter supported by said housing for generating a signal responsive to said sensor detecting a temperature in said u-joint that exceeds a predetermined temperature;
   a receiver located remotely from said transmitter to receive said signal; and
   a power supply supported by said housing for providing power to said transmitter.

16. The system as set forth in claim 15 wherein said power supply generates electricity when the temperature of the vehicle component achieves an initial threshold temperature that is less than or equal to said predetermined temperature.

17. The system as set forth in claim 16 wherein said power supply is fixed to said housing during operational temperatures that are less than said initial threshold temperature so that there is no relative motion between said power supply and said housing and wherein said power supply includes a portion that is moveable relative to said housing once operational temperatures exceed initial threshold temperature.

18. The system as set forth in claim 17 wherein said power supply is attached to said housing by a material having a melting temperature that is approximately equal to said initial threshold temperature.

19. The system as set forth in claim 18 wherein said power supply is encapsulated within said housing and includes a rotating member and a stationary member, said rotating member being moveable relative to said stationary member when said material melts to generate electricity to power said sensor assembly.

20. The system as set forth in claim 19 wherein said rotating member includes a magnet and said stationary member includes a coil fixed to said housing.

21. The system as set forth in claim 20 wherein said rotating member rotates eccentrically with respect to said housing when said initial threshold temperature is exceeded.

22. The system as set forth in claim 15 wherein said u-joint is attached to a vehicle driveshaft.

23. The system as set forth in claim 22 wherein said u-joint includes a central body portion with a plurality of trunnion members extending out radially from said central body portion, said housing being mounted to said central body portion.

24. The system as set forth in claim 23 wherein each trunnion has a predetermined critical temperature at which failure begins and wherein said predetermined temperature is set at a value that is less than said predetermined critical temperature.

25. The system as set forth in claim 24 wherein said predetermined temperature is less than said predetermined critical temperature by at least 20° F.

26. The system as set forth in claim 24 wherein said power supply only generates power when the temperature of said central body portion achieves an initial threshold temperature that is less than said predetermined temperature.

27. A method for determining temperature of a vehicle component comprising the steps of:
   (a) mounting a sensor assembly to a vehicle component;
   (b) activating a power supply to power the sensor assembly when the component operating temperature exceeds an initial threshold temperature; and
   (c) generating a signal responsive to the sensor assembly detecting a temperature in the vehicle component that exceeds a predetermined temperature that is greater than the initial threshold temperature.

28. A method as set forth in claim 27 wherein step (a) is further defined as mounting the sensor assembly to a u-joint.

29. A method as set forth in claim 27 including the step of transmitting the signal to a location remote from the sensor assembly after step (c).

30. A method as set forth in claim 27 including the steps of determining a critical failure temperature for the vehicle component and setting the predetermined temperature at a value that is less than the critical failure temperature.

31. A method as set forth in claim 27 including the steps of forming the power supply from at least a first component and a second component;

holding the first and second components fixed relative to each other at temperatures below the initial threshold temperature;

releasing the first component for movement relative to the second component once the initial threshold temperature is exceeded; and generating power as the first component moves relative to the second component to supply power to the sensor assembly.

32. A method as set forth in claim 31 including the step of attaching the first component to the second component with a material having a melting temperature that is approximately equal to the initial threshold temperature.

33. A method as set forth in claim 32 wherein the material is an epoxy material applied as an adhesive to attach the first component to the second component.

34. A method as set forth in claim 32 including the steps of forming at least one fastener from the material and fastening the first component to the second component with the fastener.

* * * * *